Oct. 25, 1932.  C. H. WOLFE  1,884,473
ADDING AND REGISTERING MACHINE
Filed Sept. 8, 1924  5 Sheets-Sheet 1

INVENTOR.
CLARENCE H. WOLFE,
BY
HIS ATTORNEYS.

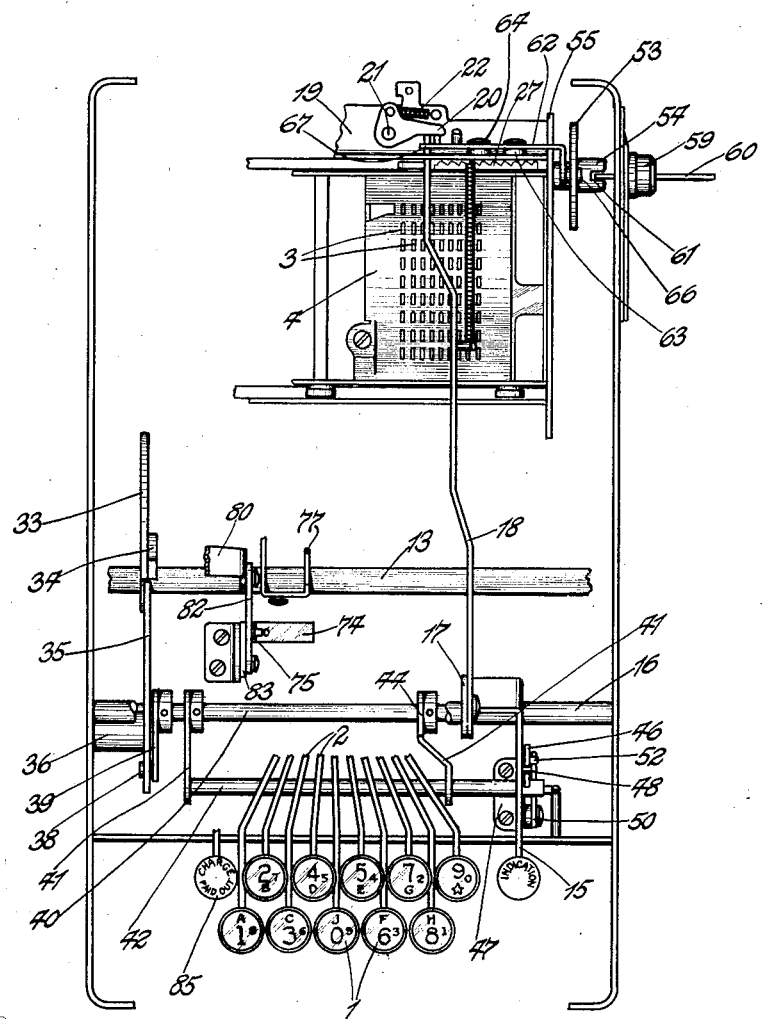

Oct. 25, 1932.   C. H. WOLFE   1,884,473
ADDING AND REGISTERING MACHINE
Filed Sept. 8, 1924   5 Sheets-Sheet 3
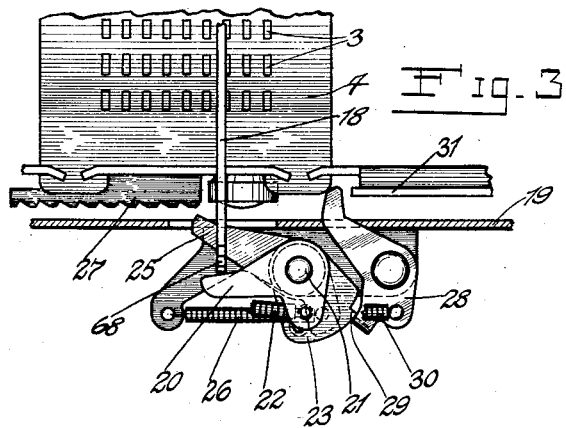
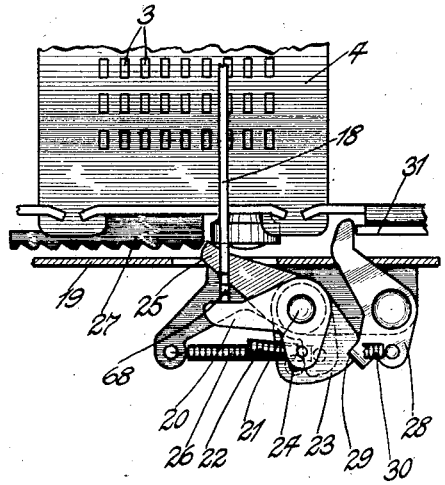
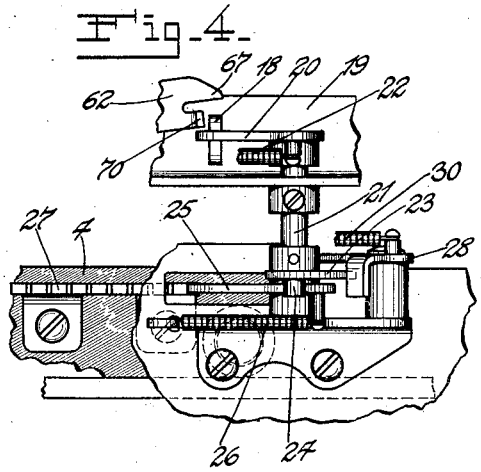
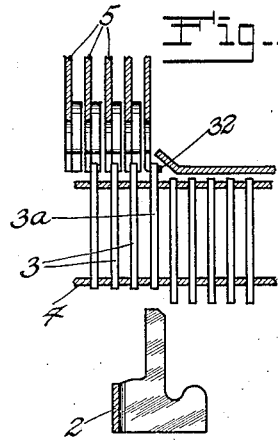
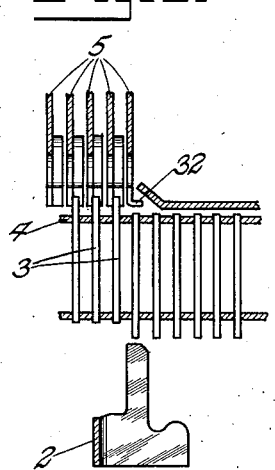
INVENTOR.
CLARENCE H. WOLFE,
BY
*Rippey Kingsland,*
HIS ATTORNEYS.

Oct. 25, 1932.   C. H. WOLFE   1,884,473
ADDING AND REGISTERING MACHINE
Filed Sept. 8, 1924   5 Sheets-Sheet 4
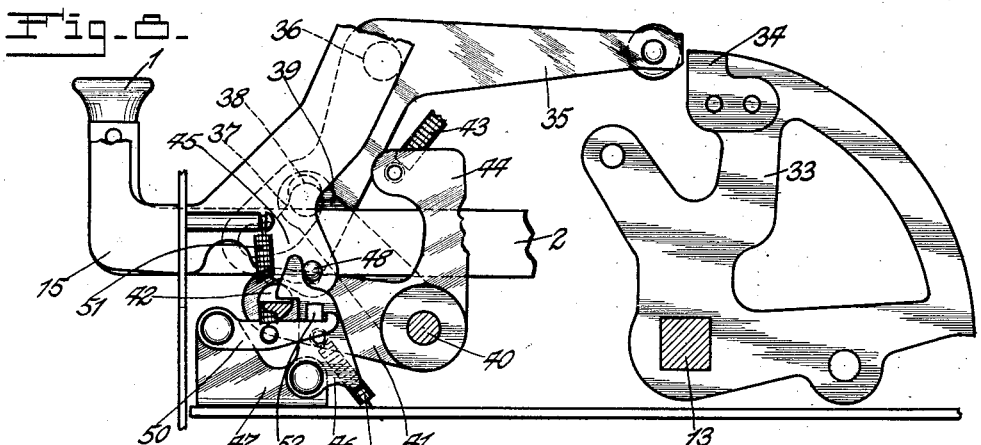
Fig-8-
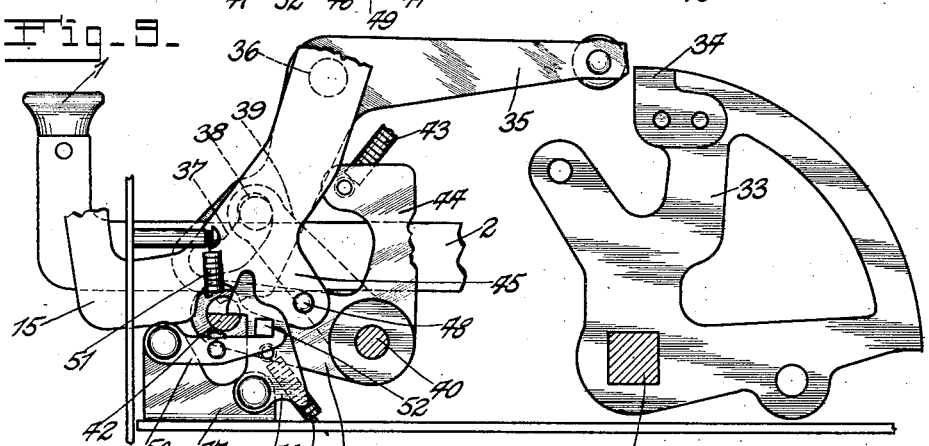
Fig-9-
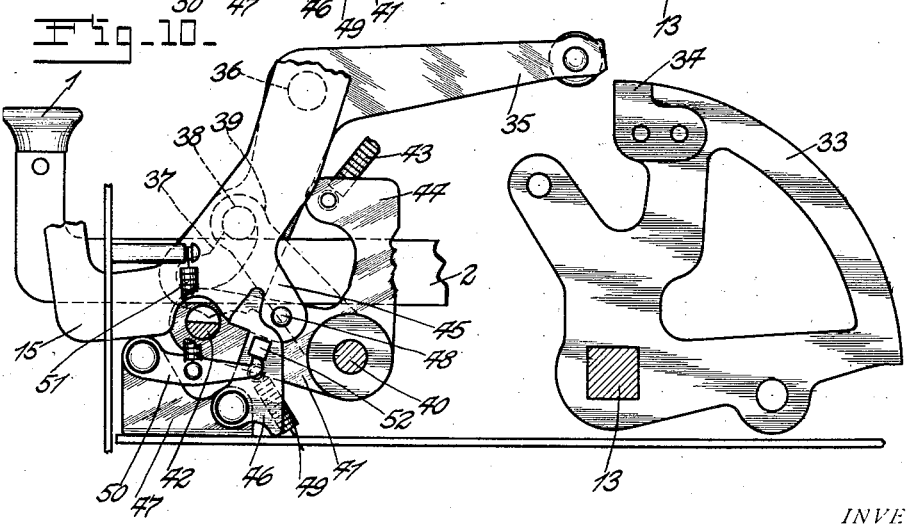
Fig-10-
INVENTOR.
CLARENCE H. WOLFE,
BY
HIS ATTORNEYS.

Oct. 25, 1932.  C. H. WOLFE  1,884,473

ADDING AND REGISTERING MACHINE

Filed Sept. 8, 1924    5 Sheets-Sheet 5

INVENTOR.
CLARENCE H. WOLFE,
BY
Rippey Kingsland
HIS ATTORNEYS.

Patented Oct. 25, 1932

1,884,473

UNITED STATES PATENT OFFICE

CLARENCE H. WOLFE, OF NORWOOD, OHIO, ASSIGNOR, BY MESNE ASSIGNMENTS, TO REMINGTON RAND INC., OF NEW YORK, N. Y., A CORPORATION OF DELAWARE

ADDING AND REGISTERING MACHINE

Application filed September 8, 1924. Serial No. 736,470.

This invention relates to forced designating mechanism for adding and registering machines.

An object of the invention is to provide equipment in an adding and registering machine for printing a designating character or symbol to indicate the clerk or person who made the sale or transaction when the item of the sale or transaction is introduced into the machine, and which equipment will prevent operation of the machine until the machine is so adjusted or manipulated and made ready that upon such operation the identifying character or symbol will be printed automatically and as an incident to such operation.

Another object of the invention is to provide means for disabling the equipment that prevents operation of the machine so that the machine may be operated for ordinary adding and calculating purposes without requiring the printing of any designating characters or symbols in such operations.

Another object of the invention is to provide the equipment above mentioned in an adding and calculating machine of the Dalton type, in combination with cash drawer release mechanism which will be operated to release a cash drawer automatically and as an incident to the operation of the machine as a cash register and when the identifying characters or symbols are printed; and further provide means for disabling and rendering inoperative the cash drawer release mechanism when the machine is operated for purposes of ordinary adding and calculating.

Other objects will appear from the following description, reference being made to the accompanying drawings in which Fig. 1 is a sectional elevation of the Dalton cash register machine showing the relationship of many of the parts comprising the present invention.

Fig. 2 is a plan view of many of the parts of the present invention as they appear in the machine.

Fig. 3 is a plan view of the differential stop carriage locking mechanism in normal position ready for operation.

Fig. 4 is a rear elevation of the same mechanism shown in Fig. 3.

Fig. 5 is a plan view of the differential stop carriage locking mechanism with the parts shown in the position they occupy after the designating key has been depressed.

Fig. 6 is a sectional view looking toward the rear showing the relationship of the differential stops and the key lever tappet and the heels of the adding and designating racks after an item composed of three digits has been set up in the differential mechanism.

Fig. 7 is a view similar to Fig. 6 but after the key has been operated to set up a stop in the path of the rack controlling the designating printing device.

Fig. 8 is a side elevation viewed from the right of the machine showing the locking mechanism in position to prevent operation of the machine until the keys controlling printing of the designating character have been operated.

Fig. 9 is a similar view showing the positions of the parts after the key controlling the printing of the designating character has been operated.

Fig. 10 is a similar view showing the positions of the parts after the key controlling the printing and the key for setting up the designating character have been operated.

Figure 1:
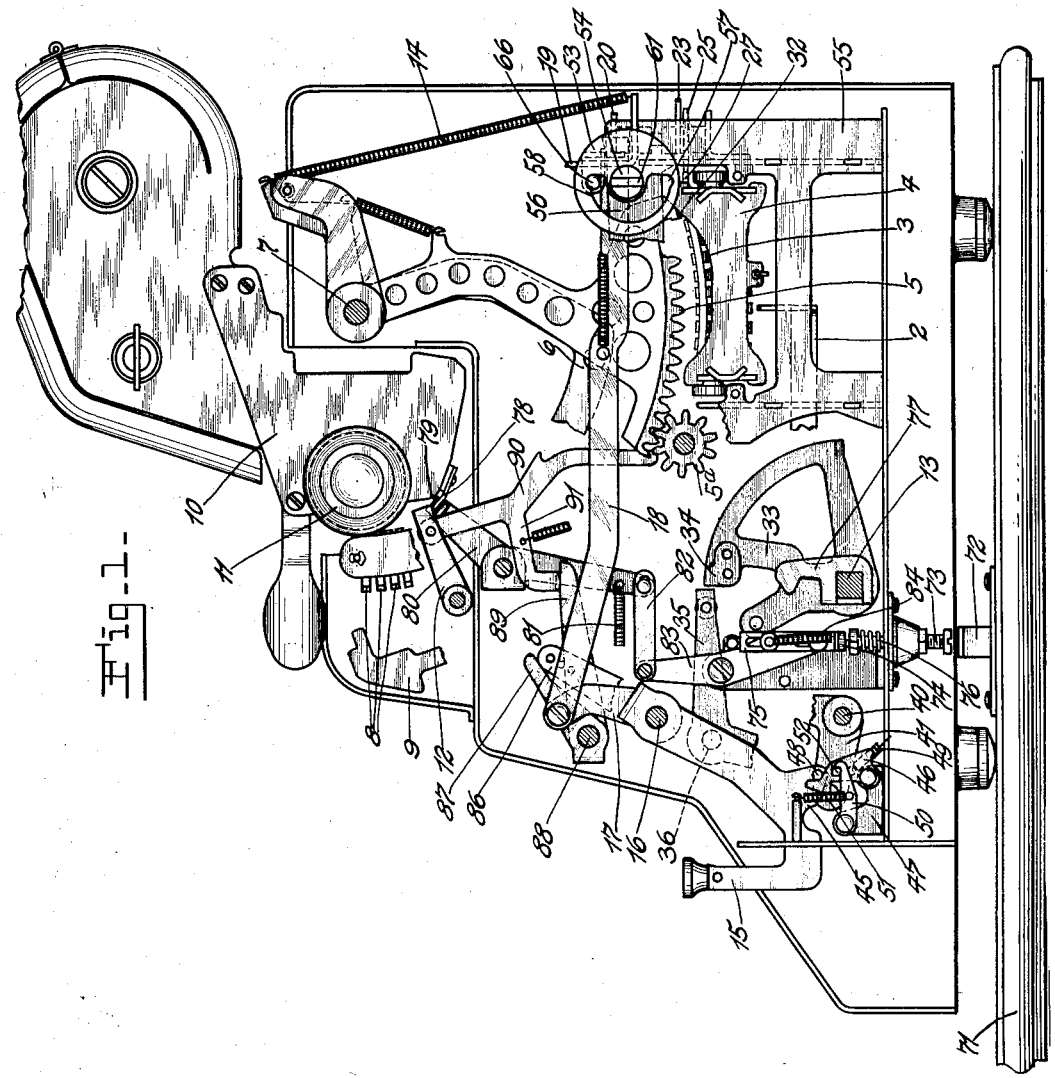
Figure 11:
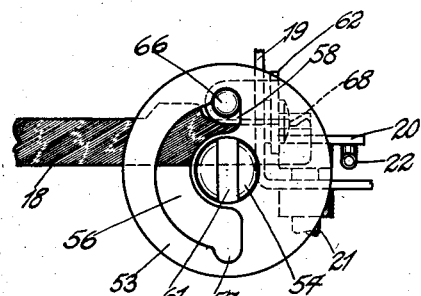
Fig. 11 is a side elevation of the device for disabling the mechanism requiring the setting up of the designating character before the machine may be operated.
Figure 13:
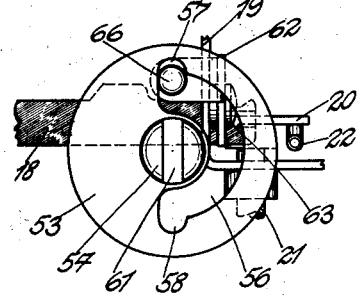
Fig. 13 is a side elevation of the mechanism shown in Fig. 11 set to disable the mechanism requiring the setting up of the designating character before the machine may be operated, and showing the parts in the positions they occupy when the machine is adjusted for use for ordinary adding and calculating purposes.

The machine in which the present invention is embodied as shown in the drawings comprises a set of keys 1 by which levers 2 are operated to control the differential mechanism comprising pins 3 in a laterally movable carriage 4. Racks 5 and associated type carriers 6 are pivotally supported upon a shaft 7 and are limited in their movements by the differential pins 3. The type 8 on the type carriers are driven by hammers 9 to print on paper supported in a laterally movable paper carriage 10 having the usual platen 11. A ribbon support 12 guides a ribbon between the type and the platen and is movable so that different colored strands of the ribbon may be utilized in printing different data; for instance, in printing the items in ordinary addition the upper strand of the ribbon will be utilized, and in printing the totals the lower strand of the ribbon, which is of a different color from the upper strand, will be utilized.

The present invention also controls the ribbon guide to print certain items, such as charge and paid out items, by use of the lower strand of the ribbon which is usually red as distinguished from the upper strand of the ribbon which is usually of a dark color. Said machine also includes the main rock shaft 13 which is rocked forward and back at each operation and which controls the operation of the type carriers and racks. Springs 14 actuate the type carriers and racks toward printing position. When it is desired to operate the type carriers and racks for any purpose it is necessary to turn the rock shaft 13 in a forward direction and the type carriers and racks are restored to their starting positions automatically and as an incident to the return of the rock shaft 13 to its starting position. The machine also includes a series of calculating pinions 5ª operative in adding and clearing operations by the racks 5. The mechanism described is included in the Dalton adding machine constructed in substantial conformity with the disclosure of Hopkins Patent No. 1,039,130, dated September 24, 1912.

An application filed by Harry Landsiedel, May 31, 1923, Serial No. 642,401, (eventuating in Patent No. 1,601,398, September 28, 1926) discloses designating column mechanism for adding machines, essential parts of which are also shown in the accompanying drawings and with which the present invention is cooperatively related. By the mechanism of said application designating characters may be printed to indicate the clerk or person making a sale or transaction when the item of the sale or transaction is introduced into the machine and printed; but the mechanism of said application leaves it optional with the operator to print the designating character or not. The present invention is cooperatively related with the mechanism of the said Landsiedel application to require the printing of a designating character when the machine is used as a cash register machine, so that at any period of inspection of the listed items, the designating characters or symbols opposite them indicate the clerks or persons who made the respective sales or transactions. I will first describe the essential parts of the invention of the Landsiedel application (Patent No. 1,601,398) with which the present invention cooperates.

An indication key lever 15 is pivoted upon a shaft 16 (Figs. 1 and 2) and has an upwardly projecting arm 17 to which the forward end of a link 18 is pivoted. The rear end of the link 18 is supported for sliding movements by a bracket 19 and normally abuts against an arm 20 attached to the upper end of a rock shaft 21.

The arm 20 is actuated in a forward direction (Figs. 3 and 5) by a spring 22. An arm 23 (Fig. 4) attached to the rock shaft 21 has a projection 24 engaging one edge of the heel of a latch element 25 pivoted on the shaft 21 and actuated in a forward direction by a spring 26. The carriage 4 supports a rack 27 with which the latch 25 engages when the key lever 15 is depressed to move the link 18 forwardly from the arm 20 thereby permitting the springs 22 and 26 to retract, with the result that the latch 25 engages the rack 27 and prevents further movement of the carriage 4 toward higher denominational orders. When the shaft 21 is turned by the spring 22 (Fig. 5) it is held in such position by a latch 28 engaging a shoulder 29 on the arm 23. A spring 30 actuates the latch 28 to such position. The opposite arm of the latch 28 is in the path of movement of a part 31 on the carriage 4 so that when said carriage is returned to its starting position the part 31 releases the latch 28 from the arm 23 and permits the key lever 15 to rise and move the link 18 rearwardly, thereby disengaging the latch 25 from the rack 27.

Said Landsiedel application (Patent No. 1,601,398) discloses that the type carrier toward the right from the lowest denominational order of the regular series of type carriers is a special type carrier and may be utilized for printing designating characters or symbols. By reference to Fig. 2 of the present drawings it will be seen that each of the keys 1, in addition to the digits represented thereon, is provided with a designating character. After the item has been set up in the differential carriage by operation of the numeral keys in the familiar manner, the connections above described, comprising the key lever 15 and associated parts, are operated to block the carriage from further movement toward higher denominational orders, which blocking is effected by engagement of the latch 25 with the rack 27 as explained. Next, the key 1, bearing the proper designating character or symbol corresponding to the clerk or person making the transaction represented by the item set up in the differential mechanism, is operated raising one of the stops in the differential carriage as indicated by 3ª (Fig. 7) into the line of movement of the heel 32 of the rack 5 to the right of the rack in the lowest denominational order. Next, the rock shaft 13 is operated, with the result that the printing devices comprising the type-carriers 6 and the calculating mechanism comprising the racks 5 and the pinions 5ª of the machine operate in the usual way to perform their respective functions.

From the foregoing it is apparent that it remains optional with the operator to print the designating character or not. My present invention comprises means to require the printing of a designating character so that such operation cannot be omitted inadvertently or intentionally.

An arm 33 is attached to the rock shaft 13 and has a piece 34 attached to one side near its upper end. The locking member 35 pivoted upon a stud 36 is controlled so that its rear end is in line with the piece 34 (Figs. 2 and 8) when the machine is to be used as a cash register, or for other purposes, wherein it is desired to print designating characters or symbols opposite the listed items. The locking arm is angular in side elevation and the lower portion thereof has a cam slot 37 into which extends a projection 38 from an arm 39 rigid on a rockable universal lock shaft 40. A bail, comprising a pair of arms 41 having their rear ends attached to the universal lock shaft 40 and their forward ends supporting a rod 42, extending transversely under the key levers 2 and 15, is provided. A spring 43 (Fig. 8) connected with an extension 44 of one of the arms 41, holds the bail rod 42 firmly against the cam-like extension 45 of the key lever 15.

A latch pawl 46 for the bail rod 42 is pivoted upon a bracket 47 and is held against a projection 48 on the extension 45 of the key lever 15 by a spring 49. A cooperating latch pawl 50 pivotally supported by the bracket 47 is actuated by a spring 51 to engage a projection 52 from the latch pawl 46 and holds said latch pawl 46 in latching position with respect to the bail rod 42 when the key lever 15 is operated (Fig. 9).

In operating the machine to list an item and to print a designating character or symbol opposite it, the keys 1 are operated to set up the item in the differential mechanism in the usual way. The bail rod 42 is depressed at each depression of a key lever, but the latch pawl 46 is retained in effective latching position by the projection 48. After the item has been set up in the differential mechanism the indication key lever 15 is depressed carrying the cam extension 45 away from the bail rod 42, and the projection 48 away from the latch pawl 46 (Figs. 8 and 9). The spring 43 then raises the bail rod 42 slightly and into contact with the latch pawl 46. The link 18, being moved to forward position by the key lever 15, is latched in such forward position by the devices previously described comprising the pawl 28, the arm 23, the shaft 21 and the arm 20 (Figs. 3, 4 and 5). The slight upward movement of the bail rod 42, resulting from the depression of the key lever 15, is insufficient for the projection 38 to move the arm 35 out of the path of movement of the piece 34 attached to the arm 33, so that it will still be impossible to turn the shaft 13 in a forward direction to list the item set up in the differential mechanism (Fig. 9). Next, that one of the keys 1 bearing the proper designating character or symbol is depressed to set up the corresponding pin 3ª (Fig. 7) in the differential mechanism to control extent of movement of the character or symbol bearing type carrier so that the type required to print the corresponding character or symbol will be positioned at the printing line when the machine proper is operated. The key lever 2 that is depressed while the key lever 15 is in its depressed position forces the bail rod 42 downwardly a sufficient distance to cause said bail rod to release the latch pawl 50 from the projection 52 on the latch pawl 46, whereupon the spring 49 draws the latch pawl 46 away from the bail rod 42. After the key 1 is released and the lever 2 thereof rises, the spring 43 raises the bail 42 and rocks the shaft 40, with the result that the projection 38 is raised in the cam slot 37 a sufficient distance to raise the locking member 35 above the piece 33, so that the rock shaft 13 may be turned forwardly without obstruction to cause the machine to operate to list the item and the designating character or symbol set up in the differential mechanism. When the differential carriage 4 releases the devices holding the indication key 15 depressed, said key 15 is raised to its normal position in which the cam extension 45 depresses the bail rod 42 and in which the projection 48 moves the latch pawl 46 to extend above the end of the bail rod 42, permitting the latch pawl 50 to engage behind the projection 52, thus clearing the differential mechanism and preparing the machine for another operation.

The mechanism for compelling the setting up and printing of a designating character or symbol may be disabled or deprived of function so as to enable the machine proper to be operated for ordinary purposes of addition and calculation, and I will now proceed to a description of the devices for accomplishing this result.

Figure 15:
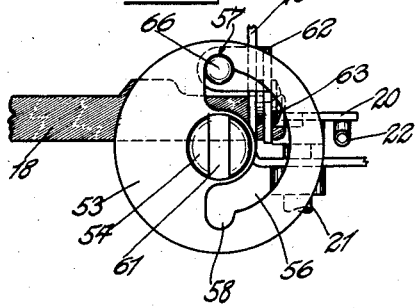
Fig. 15 is a view showing the link controlled by the indication key latched in position to hold the indication key inoperative to permit continuous operation of the machine for ordinary adding and calculating purposes.
Figure 12:
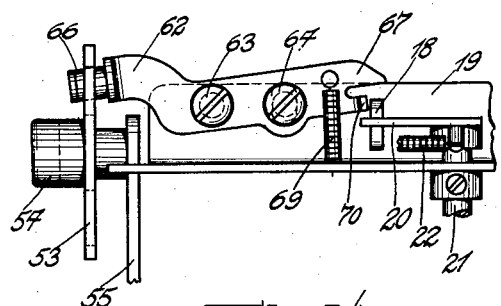
Fig. 12 is a rear elevation of the same mechanism shown in Fig. 11.
Figure 14:
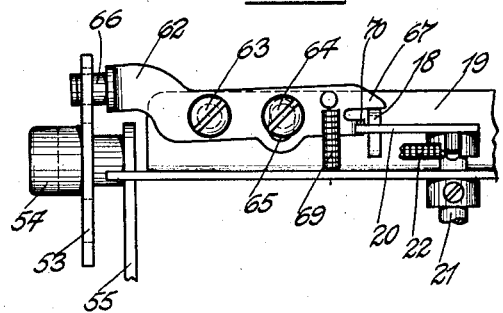
Fig. 14 is a rear elevation of the same.
Figure 16:
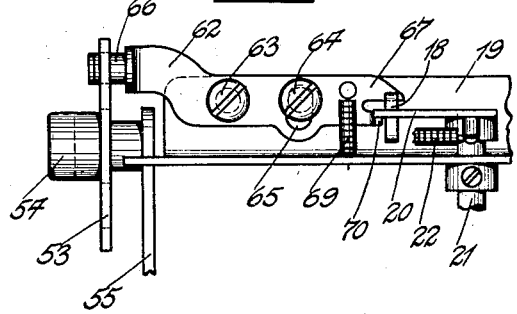
Fig. 16 is a rear elevation of the same mechanism shown in Fig. 15.

A disc 53 (Figs. 1, 2 and 11 to 16 inclusive) is attached to a hub 54 rotatively supported by a stationary part 55. The disc 53 has an eccentric cam slot 56 therein extending slightly more than half the distance around the hub and terminating in outwardly extending radial notches 57 and 58 respectively. A lock barrel 59 (Fig. 2) is supported by the case of the machine and is rotative by an insertable and removable key 60. The outer end of the hub 54 has a key slot 61 which receives the end of the key 60 to permit rotation of the disc 53 by said key. An arm 62 (Figs. 2 and 11 to 16 inclusive) is mounted on a pivot 63 on the bracket 19 and is guided and limited in its movements by a screw 64 carried by the bracket 19 and passing through a slot 65 in said arm. The outer end of said arm 62 has a roll 66 operating in the cam slot 56. The inner end of said arm 62 has an extended portion 67 arranged to engage behind a shoulder 68 on the link 18 when the latter is in its forward position and when the roll 66 is in the longest radial notch 57 at one end of the cam slot 56 (Figs. 15 and 16). When the machine is used as a cash register, or is applied to any other use in which designating characters or symbols are desired to be printed, the disc 53 is adjusted so that the short notch 58 receives the roll 66, thus at all times while in such adjustment holding the extension 67 out of engagement with the shoulder 68 on the link 18 to permit successive and repeated functioning of the key lever 15 and the parts controlled thereby to require the printing of a designating character or symbol at each operation of the machine.

When it is desired to disable or render functionless the mechanism controlling and requiring the printing of a designating character or symbol, in order to enable the machine to be used for ordinary purposes of addition or calculation, the disc 53 is turned to position to receive the roll 66 in the long notch 57, permitting the spring 69 to actuate the inner end of the arm 62 downwardly. Thereupon, when the key lever 15 is depressed and the link 18 is moved forwardly, the extension 67 of the arm 62 engages behind the shoulder 68 on the link 18 and at the same time a tongue 70 on the arm 62 is positioned in front of the arm 20, thereby preventing the shaft 21 from turning. The machine may now be used continuously as an adding and calculating machine without printing designating characters or symbols, since the depression of any one of the key levers 2 will result in the lock member 35 being raised out of the path of the piece 34 as before described. Thereafter, when it is desired to require printing of designating characters or symbols it is only necessary to turn the disc 53 to position in which the roll 66 is engaged in the short notch 58, whereby the lock arm 62 is permanently held out of engagement with the shoulder 68.

The Dalton cash register machine is equipped with mechanism for releasing a cash drawer contained within a case 71 (Fig. 1) at each operation of the machine. The cash drawer release lever 72 is supported by the case 71. A plunger 73 operative through the base of the machine has its lower end above and adjacent to the lever 72 and its upper end below a lateral extension 74 of a slide 75. The plunger 73 is supported by a spring 76. The extension 74 is engaged and operated by an arm 77 on the rock shaft 13 at each operation of the machine, with the result that the plunger 73 is caused to operate the cash drawer and release lever 72.

My invention comprises means for rendering the cash drawer release mechanism inoperative when the paper carriage 10 is in the position it occupies when the machine is to be used for ordinary adding and calculating purposes and not as a cash register. A cam 78 attached to the paper carriage 10 engages a roll 79 in the upper end of a lever 80 that is pivotally supported intermediate of its ends. A spring 81 actuates the upper end of the lever toward the cam. A link 82 connects the lower end of the lever 80 to a pivotally supported plate 83 upon which the slide 75 is supported and actuated upwardly by a spring 84. Obviously when the cam 78 presses the upper end of the lever 80 forwardly the slide 75 is carried forwardly beyond possible engagement by the arm 77 so that the rock shaft 13 is free to operate without operating the cash drawer release mechanism. When the paper carriage is returned to position for use as a cash register the cam 78 releases the lever 80 with the result that the spring 81 actuates the parts to position in which the cash drawer release mechanism will be operated by the arm 77.

As previously mentioned in this specification, the invention comprises mechanism whereby charged and paid out items which are not included in the sales total may be recorded in a distinctive color, such as red. A charge and paid out key 85 (Fig. 2) is pivotally supported by the shaft 16 and has an upward extension 86 (Fig. 1) terminating under an arm 87 pivoted upon a shaft 88 integrally united with the rearwardly extending arm 89. When the key 85 is depressed the extension 86 is moved forwardly, thereby raising the arm 89. A link 90 has an arm 91 bearing upon the arm 89. The link 90 is connected with the ribbon mechanism 12 so that depression of the key 85 raises the ribbon mechanism a sufficient distance to present the lower color strand of the ribbon between the type and the platen.

The invention obviously obtains all of its intended objects and purposes efficiently and with facility. The construction and relationship of the parts may be varied within equivalent limits and produced in different embodiments without departure from the nature and principle of the invention. I do not restrict myself in any unessential particulars, but what I claim and desire to secure by Letters Patent is:—

1. An adding and registering machine comprising a series of type carriers for printing numbers, an additional type carrier for printing a designating character, stops for limiting extent of movement of all of said type carriers, numeral keys operable first to set said stops to represent numbers to be printed by said first named type carriers and then operable to set the proper ones of said stops to limit extent of movement of said additional type carrier, and mechanism for preventing operation of any of said numbers printing type carriers until a stop has been set to limit movement of said additional type carrier after stops have been set to represent numbers.

2. An adding and registering machine comprising a series of type carriers for printing numbers, an additional type carrier for printing a designating character, stops for limiting extent of movement of all of said type carriers, numeral keys operable first to set said stops to represent numbers to be printed by said first named type carriers and then operable to set the proper ones of said stops to limit extent of movement of said additional type carrier, and mechanism controlled in part by said numeral keys for preventing operation of any of said numbers printing type carriers until a stop has been set to limit movement of said additional type carrier after stops have been set to represent numbers.

3. An adding and registering machine comprising a series of type carriers for printing numbers, an additional type carrier for printing designating characters, stops for limiting extent of movement of all of said type carriers, and a series of numeral keys operable first to set said stops to represent numbers and to limit extent of subsequent movement of said first named type carriers and then operable to set an adjacent stop to limit extent of movement of said additional type carrier preparatory to the simultaneous operation of said additional type carrier with all or any number of said first named type carriers.

4. An adding and registering machine comprising a series of type carriers for printing numbers, an additional type carrier for printing designating characters, stops for limiting extent of movement of all of said type carriers, a series of numeral keys operable first to set said stops to represent numbers and to limit extent of movement of said first named type carriers and then operable to set an adjacent stop to limit extent of movement of said additional type carrier preparatory to the simultaneous operation of said additional type carrier with all or any number of said first named type carriers, and mechanism for preventing operation of any of said numbers printing type carriers until a stop has been set to limit extent of movement of said additional type carrier after stops have been set to represent numbers.

5. An adding and registering machine comprising a series of type carriers for printing numbers, an additional type carrier for printing designating characters, stops for limiting extent of movement of all of said type carriers, a series of numeral keys operable first to set said stops to represent numbers and to limit extent of movement of said first named type carriers and then operable to set an adjacent stop to limit extent of movement of said additional type carrier preparatory to the simultaneous operation of said additional type carrier with all or any number of said first named type carriers, mechanism for preventing operation of any of said numbers printing type carriers until a stop has been set to limit extent of movement of said additional type carrier after stops have been set to represent numbers, and devices controlled in part by said numeral keys as an incident to operation of any one of said keys in setting a stop for said additional type carrier to adjust said mechanism to permit operation of said type carriers.

6. An adding and registering machine comprising a series of type carriers for printing numbers, an additional type carrier for printing designating characters adjacent to the numbers printed by any of said series of type carriers, a laterally movable carriage, stops in said carriage for limiting extent of movement of all of said type carriers, numeral keys operable to set said stops, and mechanism for preventing operation of said series of type carriers until a stop in said carriage has been set to limit extent of movement of said additional type carrier after setting of stops for said numbers-printing type-carriers.

7. An adding and registering machine comprising a series of type carriers for printing numbers, an additional type carrier for printing designating characters adjacent to the numbers printed by any of said series of type carriers, a laterally movable carriage, stops in said carriage for limiting extent of movement of all of said type carriers, numeral keys operable to set said stops, mechanism for preventing operation of said series of type carriers until a stop has been set to limit extent of movement of said additional type carrier, a device for preventing movement of said carriage beyond a desired position, and means controlled in part by said device and in part by said numeral keys for adjusting said mechanism to permit operation of said type carriers.

8. An adding and registering machine comprising a series of type carriers for printing numbers, an additional type carrier for printing designating characters adjacent to the numbers printed by any of said series of type carriers, a laterally movable carriage, stops in said carriage for limiting extent of movement of all of said type carriers, numeral keys operable to set said stops, mechanism for preventing operation of said series of type carriers until a stop has been set to limit extent of movement of said additional type carrier, an optionally operable device for preventing movement of said carriage beyond a desired position, and means controlled in part by said device and in part by said numeral keys as an incident to operation of a numeral key to set a stop for said additional type carrier for adjusting said mechanism to permit operation of said type carriers.

9. An adding and registering machine comprising printing mechanism, a carriage movable relative thereto, stops in the carriage settable to limit extent of movement of the printing mechanism, a set of numeral keys for setting said stops to represent numbers, an additional key, and mechanism for preventing operation of said printing mechanism after setting of said stops to represent numbers until one of said numeral keys has been operated after an operation of said additional key.

10. An adding and registering machine comprising printing mechanism, a carriage movable relative thereto, stops in the carriage settable to limit extent of movement of the printing mechanism, a set of numeral keys for setting said stops, an additional key, mechanism for preventing operation of said printing mechanism until one of said numeral keys has been operated after an operation of said additional key, and means operated by said additional key and in part by said numeral keys for adjusting said second mechanism to permit operation of said printing mechanism.

11. An adding and registering machine comprising printing devices operable simultaneously to print an item and a designating character, stops for limiting extent of movement of said printing devices, a key operative to set stops to limit extent of movement of a number of said printing devices, and mechanism for preventing operation of any of said printing devices to print an item until a stop has been set to limit extent of movement of the designating character printing device after a stop has been set to limit extent of movement of a printing device.

12. An adding and registering machine comprising printing devices operable simultaneously to print an item and a designating character, stops for limiting extent of movement of said printing devices, a key operative to set stops to limit extent of movement of a number of said printing devices, mechanism for preventing operation of any of said printing devices until a stop has been set to limit extent of movement of the designating character printing device, and means for adjusting said mechanism as an incident to the setting of a stop for said designating character printing device to permit operation of said printing devices.

13. An adding and registering machine comprising devices for printing numbers, a device for printing designating characters in association with the numbers, stops settable selectively to control either said numbers or said characters printing devices as desired, and mechanism for preventing operation of the number printing devices without operating the designating characters printing device after stops have been set to control said numbers printing devices.

14. An adding and registering machine comprising devices for printing numbers, a device for printing designating characters in association with the numbers, a movable carriage, stops in said carriage for limiting extent of movement of all of said devices, means for operating said carriage to position said stops to limit extent of movement of any of said devices, and mechanism for preventing operation of the number printing devices before a stop has been set for limiting extent of movement of said designating characters printing device after stops have been set to limit extent of movement of said numbers printing devices.

15. An adding and registering machine comprising devices for printing numbers, a device for printing designating characters in association with the numbers, stops for limiting extent of movement of all of said devices, a series of numeral keys operable first to set stops to limit extent of movement of said numbers printing devices and then to set a stop to limit extent of movement of said characters printing device, and mechanism for preventing operation of the numbers printing devices before a stop has been set to limit extent of movement of the designating characters printing device.

16. An adding and registering machine comprising devices for printing numbers, a device for printing designating characters in association with the numbers, stops for limiting extent of movement of all of said devices, a series of numeral keys operable to set stops to limit extent of movement of all of said devices, mechanism for preventing operation of the numbers printing devices before a stop has been set to limit extent of movement of the designating characters printing device, and means for controlling said mechanism to permit operation of said numbers printing devices as desired.

17. An adding and registering machine comprising a laterally movable paper carriage, devices for printing numbers, a device for printing designating characters in association with numbers, mechanism for preventing operation of the numbers printing devices independently of the designating characters printing device, means for rendering said mechanism inoperative so to function thereby permitting independent operation of said numbers printing devices, a cash drawer control element operated as an incident to the simultaneous operation of said numbers and designating characters printing devices, and means controlled by said paper carriage to prevent operation of said cash drawer control element.

18. In an adding and registering machine devices for printing numbers, a device for printing designating characters in association with the numbers, settable differential mechanism for controlling said devices for printing numbers and for printing said designating characters, mechanism for preventing operation of the numbers printing devices independently of the designating characters printing device, and means for holding said mechanism in a functionless adjustment to permit independent operation of said numbers printing devices.

19. An adding and registering machine comprising differential mechanism, a series of numeral keys operable first to set parts of said differential mechanism to represent numbers and then to set other parts of said differential mechanism to represent designating characters, printing devices controlled by said parts for printing simultaneously a number and a designating character set by said numeral keys as aforesaid, and means for preventing operation of said numbers printing devices independently of said designating characters printing device.

20. An adding and registering machine comprising differential mechanism, a series of numeral keys operable to set parts of said differential mechanism to represent numbers and to set other parts of said differential mechanism to represent designating characters, printing devices controlled by said parts for printing simultaneously a number and a designating character set by said numeral keys as aforesaid, means for preventing operation of said numbers printing devices independently of said designating characters printing device, and devices for rendering said means functionless in order to permit independent operation of said numbers printing devices.

21. An adding and registering machine comprising a series of type-carriers for printing numbers, an additional type-carrier for printing designating characters, a laterally movable carriage, series of stops in said carriage for limiting extent of movement of all of said type-carriers, mechanism for setting selected stops in said carriage for movement by said carriage to positions to limit extent of movement of any desired number of said numbers-printing type-carriers and for setting a stop to limit extent of movement of said additional type-carrier, devices for preventing lateral movement of said carriage when a stop in said carriage is set to limit extent of movement of said additional type-carrier, and mechanism for preventing operation of any of said type-carriers until a stop has been set in said carriage to limit movement of said additional type-carrier.

22. An adding and registering machine comprising a series of type-carriers for printing numbers, an additional type-carrier for printing designating characters, a laterally movable carriage, series of stops in said carriage for limiting extent of movement of all of said type-carriers, mechanism for setting selected stops in said carriage for movement by said carriage to positions to limit extent of movement of any desired number of said numbers-printing type-carriers and for setting a stop to limit extent of movement of said additional type-carrier, devices for preventing lateral movement of said carriage when a stop is set to limit extent of movement of said additional type-carrier, mechanism for preventing operation of any of said type-carriers until a stop has been set in said carriage to limit movement of said additional type-carrier, and means for controlling said last-named mechanism to permit operation of said numbers-printing type-carriers without setting a stop for said additional type-carrier.

23. An adding and registering machine comprising a series of type-carriers for printing numbers, an additional type-carrier for printing designating characters, a differential carriage movable from and to a starting position, stops in said carriage for limiting extent of movement of all of said type-carriers, means for setting said stops for movement by said carriage to positions to limit extent of movement of said type-carriers, mechanism for preventing lateral movement of said carriage when a stop is set to limit extent of movement of said additional type-carrier, an element for engaging and holding said mechanism in position to prevent lateral movement of said carriage, means for releasing said element from said mechanism as an incident to movement of said carriage to its starting position, and means for preventing operation of any of said type-carriers until a stop has been set in said carriage for said additional type-carrier.

24. An adding and registering machine comprising a series of type-carriers for printing numbers, an additional type-carrier for printing designating characters, a differential carriage movable from and to a starting position, stops in said carriage for limiting extent of movement of all of said type-carriers, means for setting said stops for movement by said carriage to positions to limit extent of movement of said type-carriers, mechanism for preventing lateral movement of said carriage when a stop is set for said additional type-carrier, an element for engaging and holding said mechanism in position to prevent lateral movement of said carriage, means for releasing said element from said mechanism as an incident to movement of said carriage to its starting position, means for preventing operation of any of said type-carriers until a stop has been set in said carriage for said additional type-carrier, and devices for adjusting said means to permit operation of said numbers-printing type-carriers without setting a stop for said additional type-carrier.

25. An adding and registering machine comprising printing mechanism, a set of numeral keys, a movable carriage, stops in said carriage settable by said keys for movement by said carriage to positions in which the stops set by said keys are in cooperative relationship to the printing mechanism, an additional key, mechanism controlled in part by said additional key for preventing operation of said printing mechanism until one of said numeral keys has been operated after an operation of said additional key, and means operated in part by said additional key and in part by said numeral keys for adjusting said mechanism to permit operation of said printing mechanism.

26. In a machine of the character described, a series of numbers-printing type-carriers, a type-carrier for printing designating characters in association with the numbers, a set of numeral keys, a carriage, stops in said carriage settable by said numeral keys for movement by said carriage to positions to limit extent of movement of all of said type-carriers, means for preventing movement of said carriage when any one of said numeral keys is operated to set a stop in said carriage to control said characters-printing type-carrier and a device for preventing effective operation of said means.

27. An adding and registering machine comprising devices for printing numbers, a device for printing designating characters in association with the numbers, a carriage, stops in said carriage for limiting extent of movement of all of said devices, digit keys for setting stops in said carriage for movement by said carriage to positions to limit extent of movement of said devices, elements for preventing movement of said carriage when a stop is set in said carriage to control said characters-printing device, a part holding said elements in position to prevent movement of said carriage, means operable by said carriage to set said part in position to permit movement of said elements to positions to permit movement of said carriage and a device for preventing effective operation of said elements.

28. An adding and registering machine comprising type-carriers for printing numbers, a device for printing designating characters in association with the numbers, a carriage, stops in said carriage for limiting extent of movement of all of said type-carriers and said device, keys for setting stops in said carriage for movement by said carriage to positions to limit extent of movement of said type-carriers and for setting stops in said carriage to stop said device, devices for preventing movement of said carriage when a stop is set in said carriage by one of said keys to control said characters-printing device, and means for preventing operation of said type-carriers until a stop has been set by one of said keys to control said characters-printing device and thereby indicating the fact that said last-named stop has not been set.

29. An adding and registering machine comprising type-carriers for printing numbers, a device for printing designating characters in association with the numbers, a carriage, stops in said carriage for limiting extent of movement of all of said type-carriers and said device, mechanism for setting stops in said carriage for movement by said carriage to positions to limit extent of movement of said type-carriers and for setting stops in said carriage to stop said device, automatic devices for preventing movement of said carriage when a stop is set in said carriage to control said characters-printing device, means for preventing operation of said type-carriers until a stop has been set to control said characters-printing device and thereby indicating the fact that said last-named stop has not been set, and devices for controlling said means to permit operation of said type-carriers without setting a stop for said characters-printing device.

30. In a machine of the character described, a movable carriage, a device movable into and out of engagement with said carriage to prevent and permit movement of said carriage, an element holding said device out of engagement with said carriage, means for operating said element to position to permit said device to engage said carriage and to position to disengage said device from said carriage, a latch preventing disengagement of said device from said carriage by said element, means operated by said carriage for releasing said latch to permit said element to disengage said device from said carriage, and means for preventing said device from engaging said carriage when said element is in position to permit said device to engage said carriage.

31. In a machine of the character described, a carriage movable from and to a starting position, elements in said carriage, keys for setting said elements for movement by said carriage to effective positions, a device for preventing movement of said carriage beyond a selected position, a shaft mounted for rocking movements from and to a starting position, means for preventing turning of said shaft from its starting position until one of said elements in said carriage has been set while said carriage is held from movement by said device, and devices controlled in part by the respective keys operated to set one of said elements, while said carriage is held from movement by said device, for moving said means to position to permit said shaft to be turned from and to its starting position.

32. An adding and registering machine comprising devices for printing items and designating characters adapted to operate in conjunction with or independently of a cash drawer control element as desired, means requiring the printing of designating characters with certain of said items, a ribbon shiftable to different positions to cooperate with said printing devices, mechanism normally holding the ribbon in position for the printing devices to act on one lateral portion of the ribbon, and manual means operable when printing items that do not indicate cash put into said drawer for operating said mechanism to move said ribbon to a position so that said printing devices will act on another lateral portion of said ribbon.

33. An adding and registering machine comprising printing devices, a cash drawer control element, mechanism for operating said printing devices, a device for operating said element as a consequence of an operation of said printing devices, means cooperating with said printing devices to indicate an operation thereof and of said cash drawer control element, operable control means preventing operation of said printing devices and consequent operation of said cash drawer control element while said control means remains unoperated, a paper carriage, and means operated by said paper carriage for preventing operation of said element.

34. An adding and registering machine comprising a cash drawer control element, printing mechanism, means for operating said element as a consequence of an operation of said printing mechanism, means cooperating with said printing mechanism to indicate that an operation thereof and of said cash drawer control element had been performed, control means preventing operation of said printing mechanism and consequent operation of said cash drawer control element while said control means remains unoperated, a laterally movable paper carriage, and devices holding said control means in position to permit operation of said printing mechanism and to prevent operation of said element when said printing mechanism is operated in one position of said carriage.

35. An adding and registering machine comprising a cash drawer control element, a rock shaft, printing mechanism controlled by and operable simultaneously with the rocking of said shaft, a member operated by said shaft for operating said element as a consequence of an operation of said printing mechanism, control means preventing operation of said shaft and said printing mechanism and thereby preventing operation of said control element while said control means remains unoperated, a paper carriage, and devices controlled by said paper carriage preventing operation of said element by said member in certain operations of said shaft and said printing mechanism.

36. An adding and registering machine comprising a laterally movable paper carriage, printing mechanism for printing on paper supported by said carriage, a cash drawer control element, devices for operating said element as a consequence of an operation of said printing mechanism, devices normally unconditioned for operation for printing designating characters indicating the respective items in any list of items that are printed by said printing mechanism in consequence of which said cash drawer control element had been operated, means for conditioning said devices for operation to print said designating characters, and means preventing operation of said printing mechanism while said devices remain unconditioned.

37. An adding and registering machine comprising printing mechanism, a cash drawer control element, means for operating said element as a consequence of operation of said printing mechanism or not as desired, devices for printing designating characters to designate items in lists of items printed by said printing mechanism that had been printed with a consequent operation of said cash drawer control element, optional means for causing said designated items to be printed in a color contrasting with the color of the remaining items, means for conditioning said printing devices for operation, and means preventing operation of said printing mechanism while said printing devices remain unconditioned for operation.

38. An adding and registering machine comprising printing mechanism, a cash drawer control element, devices for operating said element as a consequence of an operation of said printing mechanism, devices normally unconditioned for operation for printing designating characters indicating the respective items in any list of items that are printed by said printing mechanism in consequence of which said cash drawer control element had been operated, means for conditioning said devices for operation to print said designating characters, equipment preventing operation of said printing mechanism while said devices remain unconditioned, and elements operated by said means for operating said equipment to position to permit operation of said printing mechanism when said means is operated to condition said devices for operation.

CLARENCE H. WOLFE.